July 4, 1967  L. J. MILIACCA  3,329,194
RELIEF AND BY-PASS VALVE ASSEMBLY
Filed April 23, 1965  5 Sheets-Sheet 3

Inventor
LIVIO J. MILIACCA
Robert D. Godard  AGENT
Emerson B Donnell  ATTORNEY

July 4, 1967　　　　L. J. MILIACCA　　　　3,329,194
RELIEF AND BY-PASS VALVE ASSEMBLY
Filed April 23, 1965　　　　　　　　　　　　　5 Sheets-Sheet 4
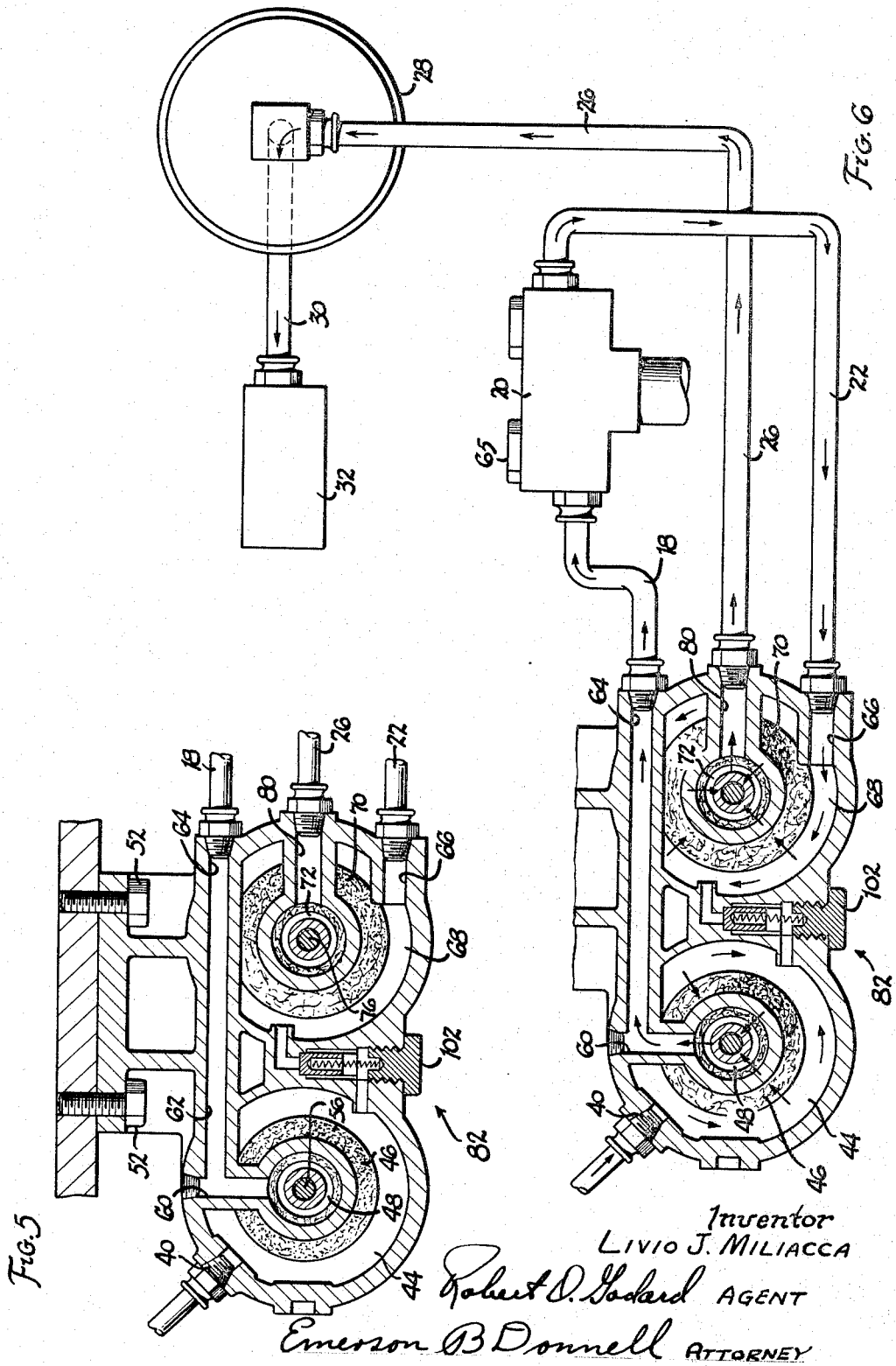
Inventor
LIVIO J. MILIACCA
Robert D. Godard AGENT
Emerson B Donnell ATTORNEY July 4, 1967  L. J. MILIACCA  3,329,194
RELIEF AND BY-PASS VALVE ASSEMBLY
Filed April 23, 1965  5 Sheets-Sheet 5

Inventor
LIVIO J. MILIACCA
Robert D. Godard AGENT
Emerson B Donnell ATTORNEY

United States Patent Office 3,329,194
Patented July 4, 1967

3,329,194
RELIEF AND BY-PASS VALVE ASSEMBLY
Livio J. Miliacca, Racine, Wis., assignor to J. I. Case Company, Racine, Wis., a corporation of Wisconsin
Filed Apr. 23, 1965, Ser. No. 450,405
7 Claims. (Cl. 158—36.3)

This invention relates to fuel systems and particularly to the filtering of fuel and the regulation of fuel flow in a fuel system.

The past history of fuel systems indicates that the filtering of fuel and the regulation of fuel flow are of prime importance in maintaining a desired quantity of clean fuel at the point of use, particularly in connection with fuel injection type engines.

The use of filters in prior fuel systems has led to a continued search for new and improved methods, arrangements, and materials for removing impurities from the fuel before it is allowed to come in contact with an injection pump to be injected into a combustion chamber. A common arrangement in a fuel system has been the use of a fuel supply tank, a first filter, a transfer pump, and a second filter, so that the fuel is cleaned as it comes from the tank and then cleaned again just before it flows to the point of use, to insure that all impurities are removed.

The fuel flows from the tank, either by gravity or suction, into and through a first filter, then flows to a transfer pump where it is subjected to a sufficient pressure to overcome friction of the lines and the filter elements and to further move the fuel toward the point of use.

The second filter receives fuel from the transfer pump, recleans the fuel, and then transmits it to the point of use.

As stated above, prior systems had two filters in the fuel line, and many arrangements incorporated the two filters in one case or under a common head. This was desirable because the common head provided a compact arrangement for the filtering elements in the limited space around an engine.

The use of fuel in injection pumps and nozzles requires "superclean" fuel because of the close fits and tolerances of the parts of the injection pump. Gritty and dirty fuel does not have smooth flow characteristics and also, any dirt or grit would cause undue wear of the delicate parts. Even the slightest wear would be intolerable in an injection jump, which raises the fuel pressure to approximately 2,000 p.s.i., or in the nozzles which must provide the proper fuel spray patterns into the combustion chamber. The filters must remove all impurities from the fuel and hold or contain the impurities in the filter element. After continued use, the filter elements become full of these impurities and tend to impede or block the flow of fuel, and the filter element must be cleaned or replaced. When a filter becomes full of impurities or is clogged, the filter no longer is able to remove all impurities.

If the second filter should clog, the fuel pressure would rise, and it might break down the filter element and feed dirty fuel to the injection pump. An unusually high fuel pressure might even rupture the filter element. This is because the transfer pump would continue to pump the fuel, but since the flow is impeded by a dirty filter element, the flow is not free and the pressure in the line may increase to the point where the fuel would be forced through the dirty filter, and therefore would not be properly cleaned. As stated, a high fuel pressure may break down the filter element and allow unclean fuel plus accumulated impurities from the filter element to flow to the injection pump.

To prevent these high fuel pressures, a relief valve was installed in the line, and when a high pressure opened the relief valve, the excess fuel would be returned to the fuel tank, thereby sacrificing the cleaning which had thus far been accomplished. The relief valve, which in the past fed fuel back to the tank, was a separate element in the fuel line and therefore required extra piping and fittings for installation in the system. A separate valve with its piping and fittings also required some of the valuable space around the fuel tank and the engine. An improved fuel filtering and regulating means was desirable to provide for a fuel system which was more compact and more easily installed and serviced.

The principal object of this invention is to provide a built-in relief valve which discharges fuel to the first filter rather than to the fuel tank, thus eliminating the extra valve and piping.

A further object is to provide means for recirculating the excess fuel within the filtering system, rather than returning it to the tank and thereby to prevent re-contamination of the excess fuel.

Such a unit gives other advantages in that a built-in relief valve does not require additional maintenance time for repair or replacement.

When new machines are shipped from the factory to distributors, the tanks and filters are normally empty of fuel to prevent a fire hazard, and are therefore filled with air at atmospheric pressure.

The filters and fuel lines must be completely filled with fuel before the engine can be operated. Therefore, the fuel must replace the atmospheric air in the filters and lines. A common method used to fill the system is to allow fuel from the tank to fill the filters by gravity, and thus force the air from the filters and lines. A bypass valve and bleed valves in appropriate places allow the fuel to do this under the gravity head in the fuel system.

In the past, the bypass valve has been installed to deliver fuel directly from the first to the second filter, and the bleed valves have been located at appropriate points to get rid of the air in the filters. Thus, it was necessary to have a separate bypass valve in the fuel line. An improvement on this arrangement is a combination bypass and relief valve.

A further object is to provide a relief valve which can also act as a bypass valve. This avoids a separate bypass valve and its associated piping and fittings, and thus reduces the costs of replcement parts and labor at periodic maintenance times.

Further objects and advantages will be apparent from the following specification and the annexed drawings, in which:

FIG. 5 is a sectional view taken along the line 5—5 of FIG. 4;

FIG. 6 is a schematic flow diagram of the fuel flow through the system;

Figure 1:
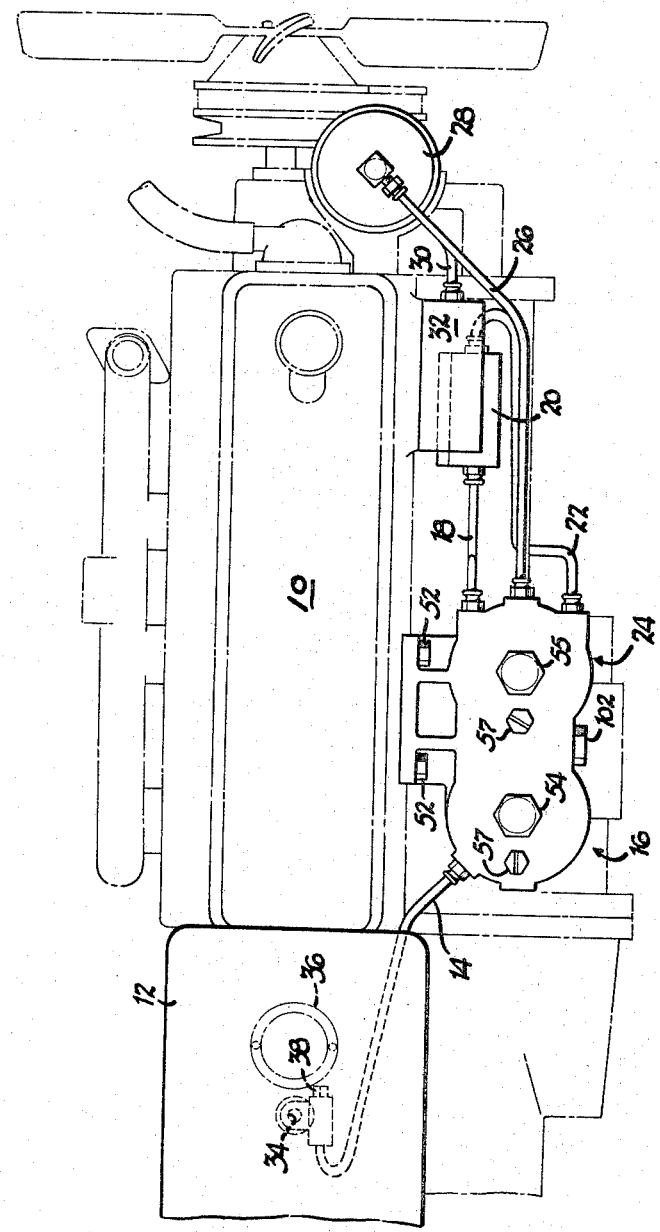
FIGURE 1 is a plan view of an engine showing the invention, parts being removed to avoid complication of the drawing.
Figure 2:
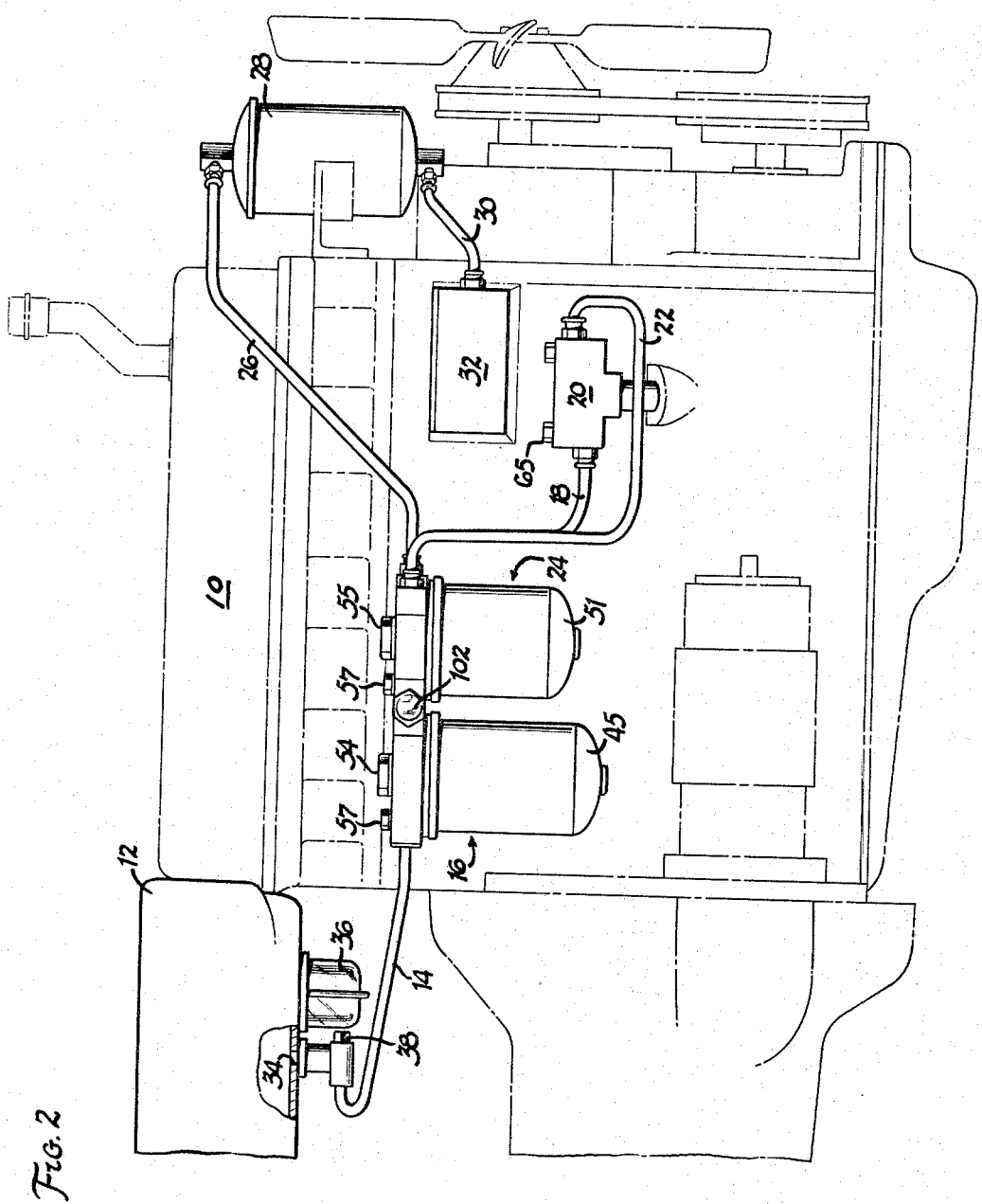
FIG. 2 is an elevation of same.
Figure 3:
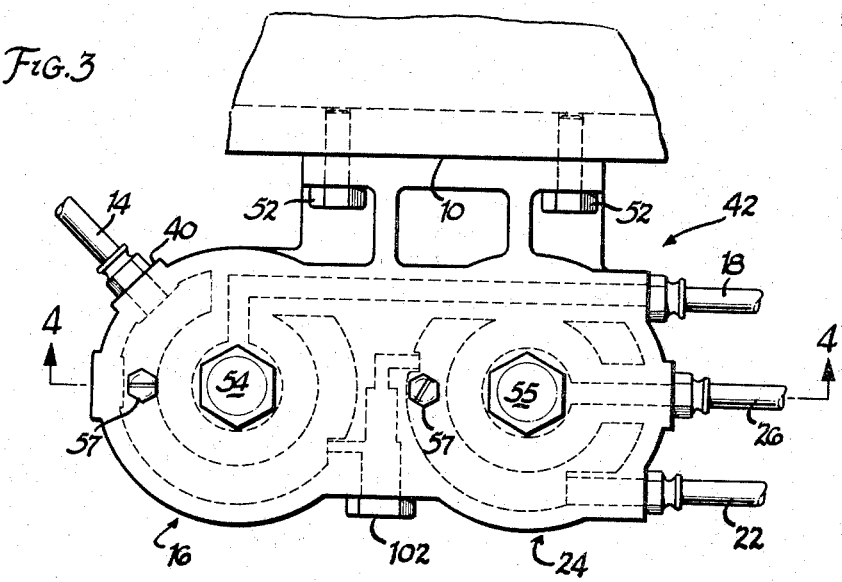
FIG. 3 is an enlarged plan view of the filter assembly.

As seen in FIGS. 1, 2, and 6, the flow of fuel is from a supply tank 12, which is normally mounted on a suitable frame at the rear of an engine 10. The fuel flows by gravity through a fuel line 14 to a first stage filter 16 where some of the impurities are removed from the fuel. From the first stage filter the fuel goes through a line 18 to a transfer pump 20. The fuel is pumped through a line 22 to a second stage filter 24 where additional impurities are removed from the fuel. A line 26 carries the fuel from the second stage filter to a third stage filter 28 which cleans the fuel a third time to insure that clean fuel is available for use in the engine. The fuel then flows through a line 30 to an injection pump 32 which injects the clean fuel into the engine in well-known manner.

As stated above, the fuel must be "superclean" for use in the injection pump and the engine so that three filters are used in the system. The sequence of the fuel flow, as outlined above, is an important feature in securing the cleanest fuel possible for optimum engine operation. This invention provides the means for insuring that clean fuel is available in the injection pump at all times.

As seen in FIG. 2, the fuel flows from the supply tank 12 through an opening 34. A line 14, through which the fuel flows by gravity and suction, runs from the fuel tank opening to a first stage filter 16. A water or sediment bowl 36 is usually mounted on the underside of the fuel tank to trap and collect some impurities which may settle in the bottom of the tank. These impurities can be drained from the bowl at periodic maintenance times. In the line 14 from the fuel tank is a cutoff valve 38 which is used to stop the flow of fuel from the tank when servicing the fuel system.

Figure 4:
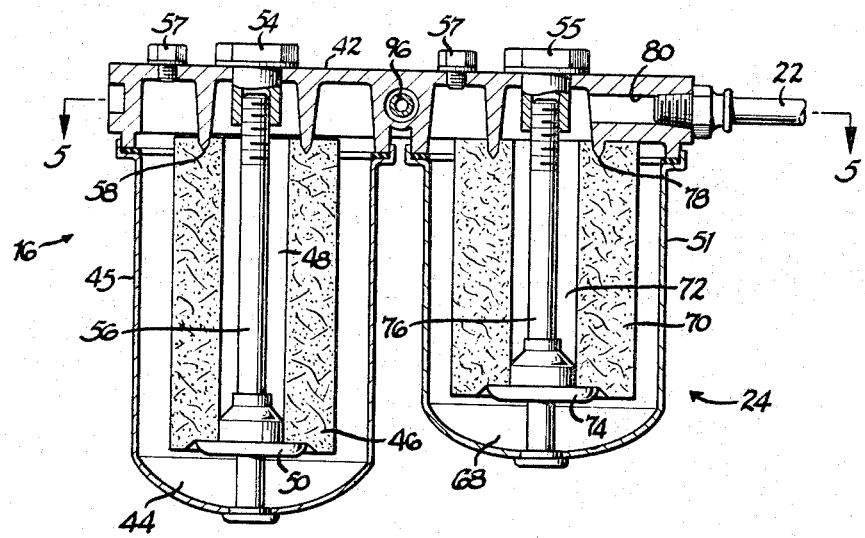
FIG. 4 is a sectional view taken along the line 4—4 of FIG. 3.

The fuel flows into the first stage filter through an opening 40 in a cover plate unit or filter head 42 into an outer chamber 44, best seen in FIG. 5, within a shell 45, FIG. 4. Shell 45 is a cylindrical vessel and the outer chamber also conforms to this shape. The fuel then passes through a first filter element 46, which in the present instance is in the form of a hollow cylinder of suitable filtering material inside the shell 45 and spaced from the wall thereof. This filter element may be of any other suitable type, within the contemplation of the invention.

When the fuel passes through the filter element in the first filter, most of the impurities such as dirt, sand and mineral deposits, are removed and these impurities are caught and become embedded in the filter material. The cleaned fuel then flows into an inner chamber 48 of the first stage filter, as shown in FIG. 4. Inner chamber 48 is cylindrical in shape and is sealed from the outer chamber at one end by a suitable retainer ring 50 so that fuel from the outer chamber cannot pass into the inner chamber 48 without passing through the filter element.

The cover plate or filter head 42 is a dual head in that it encloses and seals the top of the first shell 45 and a shell 51 of second stage filter 24. The dual head is preferably supported from the engine 10 by means of stud bolts 52. A headed plug or nut 54 is journaled in the top of the cover plate 42 in a position centered over the first stage filter 16, and a similar nut 55 is centered over second stage filter 24. A pin 56, threaded at one end, extends through the bottom of the first shell 45 and through the inner chamber 48, and is threaded into the plug 54. Pin 56 securely holds the filter element 46 and the first stage filter shell 45 against the cover plate 42. A bleed valve 57 is inserted in the top of the dual head, in communication with the first stage filter unit 16 for purposes which will be later described, and a similar bleed valve is in communication with the second stage filter 24. The cover plate on the dual head has a projecting ring-like portion 58 which extends into fluid-tight contact with the top of the first filter element so as to keep the fuel in the outer chamber from entering the inner chamber at the top of the first stage filter without going through the filter element. Communicating with the inner chamber 48 of the first stage filter, and located within the dual head is a passageway 60 connecting with a passageway 62. At one end of the passageway 62 is an outlet 64 to which is connected abovementioned pipe line 18, which line runs to the transfer pump 20. Passageways 60 and 62 and line 18 carry the fuel from inner chamber 48 to the transfer pump. Transfer pump 20 is of a suitable piston or other positive displacement type which need not be further disclosed, except to say that it has a cap 65 which is used for a purpose to be later described.

The fuel is then pumped through line 22 to an inlet 66 in the dual head 42, where the inlet communicates with an outer chamber 68 of the second stage filter 24. The second stage filter is of similar construction to the first stage filter. The fuel, under pressure from the pumping action of the transfer pump, is forced through a second filter element 70 into an inner chamber 72 of the second stage filter. A retainer ring 74, similar to ring 50 in the first stage filter, keeps the fuel from passing between the inner and outer chambers without first going through the filter element. The second stage filter also has a pin 76, similar to pin 56 in the first stage filter, which pin extends through the bottom of the shell 51, through the inner chamber 72, and threads into the headed plug 55.

The cover plate likewise has a ring-like projecting portion 78 which extends into fluid-tight contact with the top of the second filter element 70 to keep the fuel in the second stage outer chamber from entering the inner chamber at the top of the second stage filter. The second stage filter has an outlet 80 in the dual head communicating with the inner chamber 72 of second stage filter element 70 and connecting to pipe line 26 which runs to third stage filter 28.

Since the fuel is under pressure from the pumping action of the transfer pump 20, the fuel goes into the third stage filter 28 and is filtered again to remove the last bits of impurities from the fuel. The third stage filter may be the well-known throw-away type and need not be further disclosed. The "superclean" fuel then goes through line 30 into the injection pump 32. Pump 32 is of any well-known type which raises the pressure of the fuel to approximately 2,000 p.s.i., and forces the fuel through nozzles into the usual or suitable combustion chamber, not shown. Thus, it can be seen that the fuel is passed through three filter elements to obtain "superclean" fuel for the engine.

The transfer pump is of a sufficient size so that under normal conditions, it pumps too much fuel for the requirements of the engine. A very small amount of fuel that is carried into the injection pump and not required by the engine is commonly returned as "leak-off" fuel through a line, not shown, from the injection pump to the fuel tank. The fuel pumped by the transfer pump is forced through line 22 into the second stage filter. Part of the fuel passes through filter element 70 into inner chamber 72, and on through passageway 80 to pipe line 26 to third stage filter 28, the remainder being otherwise disposed of by recirculation, as will appear. The pumping of more fuel into second stage filter 24 than the engine demands will cause a rise in pressure, and also, when the transfer pump is continually pumping fuel, and the filters are removing impurities from the fuel, it is possible that one of the filters may become clogged if the fuel contains an abnormal amount of dirt, or if the filters have not been periodically cleaned or replaced. If the fuel flow is thus impeded, a rise in pressure will also take place. In either case, the pressure in the second stage filter 24 opens a relief valve to allow the fuel to be relieved of the high pressure, and to maintain a desired moderate pressure in second stage filter 24.

A second requirement of the fuel system is a bypass valve which is used when placing the system in operation for the first time or when servicing the system.

The bypass valve is used for moving fuel directly from the first stage to the second stage filter and bypassing transfer pump 20 when performing either of the above operations.

The invention provides a combination relief and bypass valve assembly 82 between the first stage and the second stage filters. The dual head or cover plate 42 which encloses the tops of both the first and second stage filters has a wall 84 between the two filters, valve assembly 82 providing for passage of fuel through wall 84 under certain conditions. A first branch or passageway 86 runs from the second stage filter outer chamber 68 to a small bore 88 in wall 84. The small bore leads to an intermediate bore 90, which intermediate bore then leads to a large bore 92. A second branch or passageway 94 runs from the large bore 92 to the outer chamber 44 of the first stage filter. The normal flow of fuel through valve 82 is from the second stage filter through the passageway 86, through bores 88, 90, 92, and through passageway 94 to the first stage filter. To summarize, the fuel normally flows from the tank into the first stage filter 16, from there to the transfer pump 20, then to second stage filter 24, and back to first stage filter 16, whatever amount is demanded by the engine passing through second stage filter 24 and on to third stage filter 28, as described.

Valve assembly 82 has a pressure regulating plunger 96 slidably mounted in bore 92. The plunger is an open cylinder type which has a bore or recess 98 and an enlarged portion 100 at a distance from the open end for a purpose to be described. A plug 102 is axially spaced from plunger 96 and threaded into large bore 92 so that it can be moved in and out of an opening 104 constructed as an extension of large bore 92. Plug 102 has a suitable head 106 and a reduced shank portion 108. An O-ring 110 is positioned about the shank portion 108 to seal the opening 104 when head 106 contacts wall 84. Plug 102 has a bore or recess 112 in the end away from the hexagonal head and also has an enlarged portion 114 at a distance from the end of the plug. A fuel overflow valve spring 116, preferably of the coil type, extends from plunger 96 to plug 102 and is positioned within bore 98 of the plunger, passageway 94, and bore 112 of the plug. The last half coil at each end of the spring has an enlarged diameter portion, each engaged with one of said enlarged portions of recesses 98 and 112, so that the spring is held captive in the bore portion 98 in the plunger and in the bore portion 112 in the plug. The captive spring is used for determining the position of the plunger in the bypass operation, as will appear.

Figure 7:
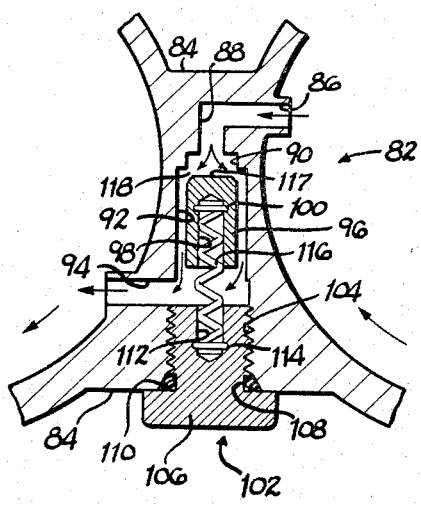
FIG. 7 is an enlarged sectional view of the valve assembly showing the valve in a regulating position.

In the regulating or normal operating conditions, transfer pump 20 continually pumps fuel from the first stage filter to the second stage filter, as stated, and shown in FIGS. 6 and 7. The normal operating fuel pressure and flow is such that the fuel goes through passageway 86, bore 88, bore 90 and against the closed end 117 of plunger 96 which causes plunger 96 to move from a closed position on a valve seat 118 formed at the junction of large bore and intermediate bore 90. As plunger 96 is moved from the valve seat, spring 116 is compressed and the excess fuel flows in an area between the plunger and the wall of bore 92, through passageway 94 and into the first stage filter.

The spring 116 is so calibrated that it controls plunger 96 to constantly regulate the flow of the fuel by the pressure in the second stage filter developed from pump 20. In this manner, it performs both a regulating and a relief function.

Figure 8:
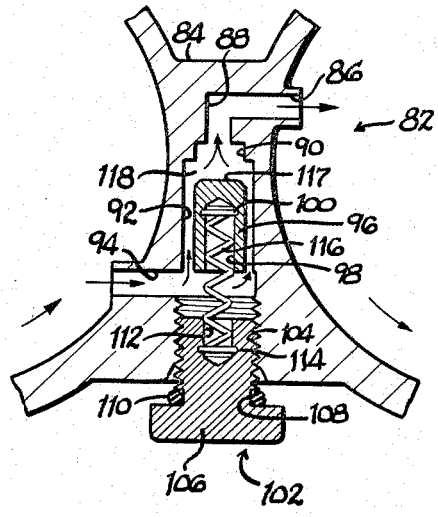
FIG. 8 is a similar view of the valve assembly showing the valve in a by-pass position.

When placing the fuel system in operation for the first time, or when servicing the system, a priming action is required to get rid of any trapped air and to fill the system with fuel. When priming the system, the action is to reverse the normal flow of fuel through the relief valve 82 as will appear, so that the fuel goes directly from the first stage to the second stage filter, shown in FIG. 8, thus bypassing the transfer pump, and promptly filling the second stage filter. Since the regulating valve is in the path of this flow, it can also perform the bypass function. In the priming bypass position, the fuel flow cannot open the valve, as it does in the regulating position, because the fuel pressure is too low and also because the fuel flow is in the wrong direction. The flow and pressure would push the plunger against the valve seat and would not allow any fuel to pass directly from the first to the second stage filter.

Figure 9:
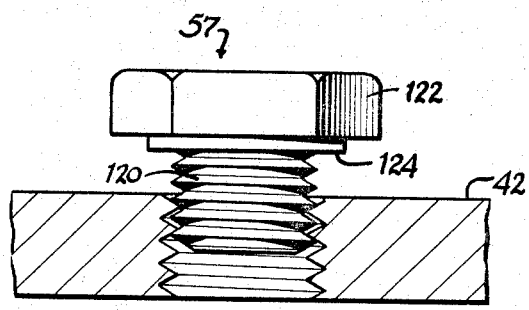
FIG. 9 is an enlarged showing of a bleed valve indicated in FIG. 4.

When priming the system, to reverse the flow through valve 82, as hereinbefore indicated, plug 102 is backed out several turns, thus allowing spring 116 to pull the valve plunger 96 away from seat 118. This is so because one end of the spring is held captive in the enlarged bore portion 114. The plunger 96 also moves toward the plug because the other end of the spring is held captive in the enlarged bore portion 100. Thus, when the plug is backed out, the plunger is removed from the seat, opening the valve so that fuel is allowed to flow from the first to the second stage filter. All the atmospheric air in the system must be replaced with fuel for proper engine operation. Each bleed valve 57 in the dual head is opened, as shown in FIG. 9, to allow the air to escape from the first and second stage filters. Bleed valve 57 is a suitable screw plug having a shank 120 and a head 122. Shank 120 has a loose fit with a suitable threaded bore in filter head 42, and a gasket 124 is interposed between head 122 and cover plate 42. As the valve is backed out, the trapped air passes around the threads into the atmosphere. The valve can be entirely removed to allow a faster escape of the air, but normally a loosening of the valve will let the air escape. After the fuel fills the dual filters, these valves are closed by turning until heads 122 press gaskets 124 against plate 42. A threaded cap 65 on pump 20 is then loosened to condition the pump to receive fuel and exhaust air, and to allow the air in passageway 62 and in line 18 to escape past the cap threads. The gravity flow of the fuel forces the air from the line, and when fuel appears at the pump cap, the latter is tightened. Pump 20 now has a sufficient quantity of fuel for operation, and the pump forces fuel through line 22 into the second stage filter, through line 26 into the third stage filter and through line 30 into the injection pump, thus replacing the atmospheric air in the system with adequate fuel for engine operation. In the priming position, the flow is in the opposite direction through the valve assembly.

The operation of the combination relief and bypass valve should be generally apparent from the foregoing description of the construction, but such operation will now be summarized. Fuel from the tank is drawn into the first stage filter by gravity and under moderate suction from the transfer pump in normal operating conditions. The transfer pump pumps and delivers more fuel through the second and third stage filters than can be used by the engine, and as a result, the pressure in the second stage filter rises and becomes greater than the pressure in the first stage filter.

The greater fuel pressure in the second stage filter forces the plunger 96 off the seat, and the fuel flows through the valve. The pressure is thus relieved and held at a desired value, the valve regulating the flow and pressure of the fuel at the same time. The excess fuel, not required by the engine at any given time, is being recirculated by passing through the second stage filter into the first stage filter, instead of going back into the fuel tank. This feature of the invention provides that the excess fuel is not again contaminated by passing through the fuel tank, and does not have to be refiltered as new fuel from the tank.

Variations of the combination relief and bypass valve assembly may occur to those skilled in the art, and it is to be understood that the invention is not limited by the embodiment described and illustrated, or in fact in any manner except as defined in the following claims.

What is claimed as new and desired to be secured by Letters Patent of the United States is:

1. A combined relief and bypass priming valve for a fuel filtering system, said system having a first stage filter and a second stage filter, a dual head covering said filters, and a passageway in said head connecting said filters, said valve including said passageway, a seat in said passageway, a plunger element slidable in said passageway, said plunger element being positioned to provide for flow of fuel past said plunger element, and, in one position, to engage said seat, a plug threadedly engaged in said dual head, said plug being positioned axially of said plunger element and also positioned to move said plunger element by reason of movement of said plug, and a spring element connected with said plunger element and with said plug so that movement of said plug in one direction will press said plunger element on said seat, and movement in the other direction will pull said plunger element off of said seat.

2. A combined relief and priming bypass valve assembly said assembly including a dual unit having juxtaposed filter chambers, a passageway in said dual unit leading from one to another of said filter chambers, and including a small bore, an intermediate bore coaxial with said small bore, a large bore coaxial with said small bore and with said intermediate bore, a valve seat formed at the intersection of said intermediate bore and said large bore, a plunger slidable in said large bore and positioned to mate with said valve seat, a threaded plug in said large bore axial of said plunger, a first bore disposed axially in said plunger, said first bore having an enlarged portion therein, a second bore disposed axially in said plug, said second bore having an enlarged portion therein, and a coil spring in said first bore and in said second bore, said spring having the terminal portion at each end enlarged to seat in the enlarged portion of said first and said second bores, so that fluid pressure on said plunger will move said plunger off of said seat, in one position of said plug, for relieving the fluid pressure, and said spring will pull said plunger off of said seat, in another position of said plug, for fluid bypass in priming operation.

3. A relief and bypass valve assembly including a filter head having two portions, said head having means for entrance and exit of fluid to be filtered, and said valve assembly being positioned in said head, a first stage filter capped by one portion of said head, a second stage filter, capped by the other portion of said head, a passageway in said head connecting said first and said second stage filters, said valve assembly having a slidable element in said passageway, said slidable element being positioned to provide for passage of said fluid about said element, threaded means in said head, said threaded means extending from the exterior of said head to said passageway, and a yieldable element connecting said slidable element and said threaded means so that movement of said threaded means will cause movement of said slidable means in the same direction.

4. A combined relief and bypass valve assembly in a system for filtering fuel, said valve assembly including a dual filter head, and said valve assembly being positioned in said head, a first stage filter and a second stage filter, said first and said second stage filters being capped by said dual head, a passageway in said dual head connecting said first and said second stage filters, said passageway having a first branch leading from said second stage filter to said passageway, a second branch leading from said passageway to said first stage filter, said valve assembly having a slidable element in said passageway, said slidable element being positioned to provide for passage of said fuel, a threaded plug in said head, said plug being positioned axially of said passageway and extending from said passageway to the exterior of said head, and a spring element connected with said slidable element and with said plug so that, in one position of said plug and said slidable element, said fuel may flow from said second stage filter to said first stage filter and, in another position of said plug and said slidable element, said fuel may flow from said first stage filter to said second stage filter.

5. In a fuel system of the type having a fuel supply tank, a filtering system, and an injection apparatus, said filtering system including a fuel filter head assembly having two portions and positioned in said filtering system between said fuel tank and said injection apparatus, and having entrances and exists for fuel to be filtered, a first stage filter, said first stage filter being capped by one portion of said head assembly and having a first filter element within said first stage filter forming an inner chamber and an outer chamber, said outer chamber being shaped so as to be engaged with said one portion of said head assembly, a second stage filter, said second stage filter being capped by other portion of said head assembly and having a second filter element within said second stage filter forming an inner chamber and an outer chamber, said outer chamber being shaped so as to be engaged with said other portion of said head assembly, a transfer pump in said fuel system positioned for receiving fuel from said first stage filter and for transmitting fuel to said second stage filter, a third stage filter positioned in said fuel system for receiving fuel from said second stage filter and for transmitting fuel to said injection apparatus, conduit means from said first stage filter to said transfer pump for moving fuel therebetween, conduit means from said transfer pump to said second stage filter for moving fuel therebetween, conduit means from said second stage filter to said third stage filter for moving fuel therebetween, conduit means from said third stage filter to said injection apparatus for moving fuel therebetween, a wall between said first and said second stage filters, said wall connecting said two portions of said head assembly, a combined relief and bypass priming valve in said wall, a passageway in said wall connecting said first stage and said second stage filters, said valve assembly being positioned in said passageway, a first branch leading from said second stage filter to said passageway, a second branch leading from said passageway to said first stage filter, a small bore, an intermediate bore and a large bore, said bores being in said passageway, a pressure regulating plunger positioned in said large bore to provide for flow of fuel past said plunger, and said plunger having a recess therein, an opening in said wall, said opening being threaded from the exterior of said wall to said large bore, a pressure regulating plug threadedly engaged in said opening, said plug having a recess therein, and a fuel overflow valve spring fixedly connected in said recess in said plunger and in said recess in said plug so that, in one position of said plug, excess pressure on said plunger will compress said spring and thereby relieve said pressure for regulating the flow of fuel and, in another position of said plug, said plug will provide tension in said spring and thereby bypass said transfer pump for priming said fuel system.

6. A combined relief and bypass valve assembly in a fuel filtering system, said valve assembly including a
  dual filter head, and said valve assembly being positioned in said filter head, a
  first stage filter and a
  second stage filter, said first stage and said second stage filters being capped by said dual head, a
  passageway in said filter head connecting said first and said second stage filters, said passageway having a
  first branch leading from said second stage filter to said passageway, a
  second branch leading from said passageway to said first stage filter, said passageway having a
  small bore forming part of said passageway, an
  intermediate bore forming part of said passageway, said small bore connecting said first branch and said intermediate bore, a
  large bore forming part of said passageway, said intermediate bore connecting said small bore and said large bore and said large bore connecting said intermediate bore and said second branch, a
  regulating plunger slidable in said passageway, said plunger being positioned in said large bore and having a closed position and an open position providing for flow of fuel past said plunger, a
  regulating plug in said large bore, said plug being threadedly engaged in said filter head and axially positioned with said plunger, and a
  valve spring connecting said plunger and said plug, said spring providing compression in one position of said plunger and said plug to hold said plunger against fuel pressure and providing tension in another position of said plunger and said plug so that in the compression position said valve assembly is substantially in the closed position in relief operation and in the tension position said valve assembly is in the open position in bypass operation.

7. In a fuel system of the type having a fuel supply tank, a filtering system, and an injection apparatus, said filtering system including a
  fuel filter head assembly having two portions and positioned in said filtering system between said fuel tank and said injection apparatus, a
  first stage filter, said first stage filter being covered by one portion of said head assembly and having an outer chamber so shaped as to be engaged with said one portion of said head assembly, a
  filter element within said first stage filter forming an inner chamber separate from said outer chamber, a
  transfer pump in said fuel system positioned for receiving fuel from said first stage filter, a
  passageway from said first stage filter outer chamber to said transfer pump for moving fuel therebetween, a
  second stage filter, said second stage filter being covered by the other portion of said head assembly and having an outer chamber so shaped as to be engaged with said other portion of said head assembly, a
  filter element within said second stage filter forming an inner chamber separate from said outer chamber, a
  passageway from said transfer pump to said second stage filter outer chamber for moving fuel therebetween, a
  third stage filter in said filtering system, a
  passageway from said second stage filter inner chamber to said third stage filter for moving fuel therebetween, a
  wall between said first and said second stage filters, said wall connecting said two portions of said head assembly, a
  combined relief and bypass valve assembly within said wall, a
  first passageway leading from said outer chamber of said second stage filter, a
  small bore within said wall, said first passageway connecting said second stage outer chamber and said small bore, an
  intermediate bore within said wall, said small bore leading into said intermediate bore, a
  large bore within said wall, said intermediate bore leading into said large bore, a
  second passageway leading from said large bore to said outer chamber of said first stage filter, said large bore connecting said intermediate bore and said first stage outer chamber, a
  pressure regulating plunger in said large bore, said plunger having a recess therein, an
  opening in said wall, said opening being threaded from the exterior of said wall to said large bore, a
  pressure regulating plug in said opening, said plug being threaded for a portion of the length thereof and extending from said exterior of said wall to said large bore, said plug having a recess therein, and said recess in said plunger and said recess in said plug having
  enlarged portions at a point spaced from said second passageway, and a
  fuel overflow valve spring in said recess in said plunger and in said recess in said plug, said spring extending across said second passageway and said spring having an enlarged portion at each end thereof engaged in said enlarged portion of said recesses so that movement of said plug will cause movement of said plunger in the same direction.

No references cited.

REUBEN FRIEDMAN, *Primary Examiner.*

W. S. BRADBURY, *Assistant Examiner.*